United States Patent [19]

Huemmer et al.

[11] 3,912,670

[45] Oct. 14, 1975

[54] RADIATION CURABLE CAN COATING COMPOSITION

[75] Inventors: Thomas F. Huemmer, South Bend; Ronald J. Plooy, Mishawaka, both of Ind.

[73] Assignee: The O'Brien Corporation, South Bend, Ind.

[22] Filed: Feb. 28, 1973

[21] Appl. No.: 336,625

[52] U.S. Cl.... 260/23 EP; 204/159.11; 204/159.12; 204/159.13; 204/159.15; 260/17 A; 260/23 R; 260/31.2 R; 260/46.5 R; 260/827; 260/836 R; 260/901; 427/54; 428/379
[51] Int. Cl.$^2$................ C08L 91/00; C08L 33/04
[58] Field of Search............ 260/901, 23 EP, 836 R; 204/159.11, 159.12, 159.15

[56] References Cited
UNITED STATES PATENTS

| | | |
|---|---|---|
| 3,215,757 | 11/1965 | Scheibli et al. ................ 260/23 EP |
| 3,224,989 | 12/1965 | Nevin............................. 260/23 EP |
| 3,450,613 | 6/1969 | Steinburg...................... 204/159.15 |
| 3,707,516 | 12/1972 | Walus................................. 260/836 |
| 3,758,428 | 9/1973 | Connelly et al................ 260/23 EP |
| 3,770,848 | 11/1973 | Labana et al....................... 260/836 |

*Primary Examiner*—Murray Tillman
*Assistant Examiner*—Thurman Kennis Page
*Attorney, Agent, or Firm*—Johnson, Dienner, Emrich & Wagner

[57] ABSTRACT

Radiation curable coating compositions for metal containers comprising a radiation curable oil having at least two radiation sensitive sites per molecule, a flow control additive and a reactive solvent selected from the group consisting of acrylic acid and mixtures of acrylic acid with another acrylic monomer.

11 Claims, No Drawings

RADIATION CURABLE CAN COATING COMPOSITION

The present invention pertains to a coating composition curable by a high energy source such as electron beam radiation or ultraviolet light and capable of developing film properties particularly useful for metal decorating application. More specifically, this invention pertains to coatings for fabricated containers for beverages, foods, aerosols and other similar metallic packaging. The coating composition is adaptable for application to either tin-free steel or aluminum substrates.

Coatings for containers are inherently formulated from materials employing from 50 to 80 percent volatile solvents. It has recently become apparent that, apart from economic factors, there is a pressing need brought about by ecology considerations to eliminate bulk emissions of solvents into the atmosphere. Metal decorators have seen the need for some time to eliminate the conventional ovens as well. Ovens are normally quite large, wasteful of energy, and impose certain restrictions on the coating line speed. Combustion of the volatile emissions from conventional ovens is quite expensive and again can be another source of pollution.

While metal decorators are quick to accept new technology such as high energy curing, there has been a deficiency of radiation curable coating compositions which can meet or exceed all the parameters of today's conventional coatings. One of the most important criteria of a can coating is its ability to adhere to the substrate throughout all conditions of fabrication and use. Using the prior art radiation curable compositions, adhesion to the "as received" substrate is difficult to obtain without surface treatment. This lack of adhesion can be attributed to many factors, among which is residual stresses within the cured coating. In a conventional oven these stresses are not as readily observed because of the built-in thermal annealing of the cure cycle. Because of the additional costs involved, metal decorators are reluctant to employ any extra surface treatment steps, such as a cleaning procedure, which might destroy process advantages and/or for that matter, a step which retains ovens in the processing line. The formulation of high energy curable coatings with additives to improve adhesion has to date been disappointing. Further, in order to be useful, the coating as formulated must meet all performance parameters, including flexibility, pasteurization resistance, low viscosity, quick response, acceptable lubricity, and low porosity as well as having good application characteristics.

It has now been discovered that high energy curable coating compositions can be formulated which accomplish the objective mentioned above by judicious selection of three essential components, namely:
 a. a radiation curable oil
 b. a flow control additive, and
 c. a specific reactive solvent system.

The radiation curable oil must have a plurality of radiation curable sites and a hydrocarbon chain flexibilizer portion. The flow control additive is a polymer which helps the coating to wet the substrate. The solvent is either acrylic acid or a mixture of acrylic acid and another acrylic monomer having a low surface tension. The overall coating composition must contain at least 20% by weight of acrylic acid. It has been found that the coatings of the present invention give unexpectedly high adhesion to metals, and to untreated aluminum in particular.

In its broadest embodiment, the present invention comprises a coating composition containing the three essential components in the following proportions:
 radiation curable oil, 10–78% by weight;
 flow control additive, 2–40% by weight;
 solvent, 20–80% by weight.

The coating composition can be either a mixture of the three basic ingredients or a combination derived from an in situ preparation in a specific reactive solvent blend.

RADIATION CURABLE OIL

In its broadest embodiment, the radiation curable oil of the present invention must have a plurality of radiation curable sites, so that it can impart radiation response and crosslinking to the coating. As the name implies, the radiation curable oil must also include a flexibilizer portion, preferably hydrocarbon chain flexibilizer, so that the oil can impart flexibility to the cured coating. It is necessary that the radiation curable oil possess both radiation responsive sites and flexibilizers in order to accomplish the objectives of the present invention.

The radiation curable oil, in order to fill its crosslinking function, must have at least two radiation sensitive groups which preferably are acrylate groups. In order to provide the proper flow characteristics, it is contemplated that the radiation curable oils will have molecular weights between about 800 and 2000 whereby the oil will have from about 2 to about 6 radiation curable groups per 1000 molecular weight. It is also preferred that the oils be essentially free of internal unsaturation whereby the oils have iodine values of 5 or less.

It has been found that superior results are obtained using radiation curable oils derived from various processed vegetable oils, such as epoxidized linseed oil, epoxidized soybean oil and hydrogenated castor oil. Such oils may be made radiation sensitive by reacting them with acrylic acid, and the radiation curable oils produced from such vegetable oil derivatives are generally preferred. The preferred oils have molecular weights in the range of about 800 to 1000 and functionality (of groups which react with acrylic acid) of from about 2.5 to about 6, with a low iodine value.

The radiation curable oil contemplated by the present invention is preferably produced by the reaction of acrylic acid or methacrylic acid with various oily materials such as epoxidized drying oils, epoxidized intermediates and various hydroxyfunctional oils. The hydroxyfunctional silicone intermediates represent another class of compositions which may be used to form the radiation curable oil. Useful materials in this class include Dow Corning's Z-6018 which is described in Example 1, Dow Corning's Z-6188, which is a low molecular weight, methoxy-functional silicone having an average molecular weight of 751, and Sklkyd 50 which is a methoxylated partial hydrolyzate of monophenyl and phenylmethyl silicones having a molecular weight of about 470. As examples, the following materials may be adducted with acrylic acid to provide useful radiation curable oils:

A. Epoxidized Linseed Oil commercially available under the trade name "Epoxol 9–5", with the following specifications:
1. Oxirane Oxygen 9% min.
2. Iodine value 5 max
3. Gardner Color Less than 1
4. Viscosity 880 cps
5. Functionality/Epoxy per molecular 5.5
6. Molecular weight (approx.) 980.

B. Epoxidized soybean oil.

C. Silicone intermediate such as Z6018, a hydroxyfunctional polysilicone having a molecular weight about 1600.

D. Hydrogenated Caster Oil commercially available under the trade name "Castorwax", with the following specifications:
1. Acid value 4.0 max
2. Iodine value 5.0 max
3. Saponification value 182
4. Hydroxyl value 165
5. Molecular Weight 932.

A second embodiment of the present invention contemplates a radiation curable oil which is formed by chemically attaching an oil or an oil component to a low molecular weight oligomer, which is radiation sensitive or which can be made radiation sensitive. The resulting product is an oligomer having an oil component attached thereto prior to the cure of the coating composition. In this embodiment it is not necessary that the oil or the oil component per se be radiation responsive, but the oil component, after being attached to the radiation responsive oligomer, is radiation responsive, and conforms to the broad definition of a radiation responsive oil within the scope of the present invention.

The radiation responsive oils of the second embodiment of the present invention may be formed, for example, by reacting a long chain acidic component with a low molecular weight trifunctional component, followed by the reaction with acrylic acid. More specifically, a suitable radiation curable oil can be formed by reacting one mole of a trifunctional epoxy resin with one mole of a long chain acid, such as stearic acid, followed by the reaction with two moles of acrylic acid. A similar product could be made by reacting the same acid components with glycerin or trimethylol propane. When this approach is used it is preferred that the hydrocarbon chain of the long chain acid be saturated. Examples of suitable acids contemplated by the present invention are pelargonic acid, lauric acid, stearic acid and palmitic acid.

RADIATION CURABLE OLIGOMER

While it is possible, and indeed in many cases it is desirable, to use the radiation curable oil as the sole radiation curable component in the coating compositions of the present invention, in many cases it is desirable to increase the radiation response of the overall curable component, by the addition of a highly radiation sensitive material, of low molecular weight hereinafter referred to as a radiation curable oligomer. When the coating compositions of the present invention are based on radiation curable oils of relatively high molecular weight, it is frequently preferable to add to the coating composition a radiation curable oligomer for the purpose of increasing radiation response, or lowering the "dose-to-cure" requirement, which results in a very desirable higher line speed when the coating composition is used on a radiation curing line. In addition, a radiation curable oligomer, which functions as a secondary resin constituent in the coating composition, imparts solvent resistance to the coating for improved top coat acceptance, and improves mar-resistance of the film which gives the coated substrate better handling characteristics.

The radiation curable oligomer must contain at least two (and preferably more than two) radiation curable sites, per molecule, in order to accomplish the crosslinking function. In order to produce a composition having appropriate rheology characteristics, the oligomer must have a molecular weight between about 300 and 2000. Basically the oligomer is a low molecular weight resin, having appended thereto a plurality of acrylate groups or methacrylate groups. It is preferred that the radiation curable oligomer have an acrylate equivalent weight of no more than about 300. Preferably, the oligomer is formed by the reaction of acrylic acid or methacrylic acid with epoxy functions attached to the backbone of the low molecular weight resin, although the invention contemplates the attachment of the radiation sensitive groups to the backbone by other mechanisms.

The preferred oligomers are the reaction product of acrylic acid or methacrylic acid with low molecular weight polyfunctional epoxy compounds, that is epoxy resins containing at least 2 epoxy groups per molecule and having molecular weights from about 300 to about 1500. Several of the preferred oligomers are illustrated in the examples given below. Among commercially available epoxy resins which may be used to produce the oligomers of the present invention are Union Carbide's ERL-2795 which is a low molecular weight, low viscosity bisphenol A type epoxy resin containing 179–194 grams of oxirane oxygen per mole. Also useful are the various Epon resins sold by Shell Chemical Company, such as Epon resin 812, Epon resin 815, Epon resin 820, Epon resin 828, and Epon resin 830. All of the epichlorohydrin/bisphenol A type low molecular weight epoxy resins which have epoxy equivalent weights between 140 and 210. Other epoxy resins may be used, but when the epoxy equivalent weight exceeds about 400, the molecular weight of the resulting oligomer becomes undesirably high. Also useful are the epoxy novolac resins of low molecular weight sold under the designation DEN by Dow. In particular DEN438 which has an epoxy equivalent weight of 176–181 and an epoxy functionality of about 3.6 and DEN439 which has an epoxy equivalent weight of 191–210 and an epoxy functionality of about 3.8 or DEN431 which has an epoxy equivalent weight of 172–179 and an epoxy functionality of about 2.2 can be used.

The ratio of the radiation curable oil portion to the radiation curable oligomer portion of the radiation curable components may vary over wide limits, depending primarily upon the characteristics of the radiation curable oil used and to some extent on the intended use of the coating. When the radiation curable oil has a low equivalent weight, it will yield, upon curing, a relatively hard coating which will require little or no radiation curable oligomer to give the desired hardness, as compared to a radiation curable oil of higher equivalent weight which will yield a relatively slow curing, soft coating and which may require a substantial proportion of radiation curable oligomer. Generally it is contemplated that the radiation curable resinous component of the coating (except for the solvent system) should comprise from about 40% to 100% of radiation curable oil, the balance being the radiation curable oligomer.

As was mentioned above, it is preferred that the radiation responsive component, whether made up of an oligomer plus a radiation responsive oil or whether made up of a single component oligomer-oil have an average molecular weight between about 300 and 2000. It has been found that curable components having average molecular weights above about 2000 are too viscous, and require a greater quantity of solvents than can be used to give the desired film properties. Since the coating compositions of the present invention contain only convertible materials, the solvents enter into the curing reaction. Generally, it is preferred that the coating composition contain no more than about 50% by weight of monomer solvents, although up to about 80% by weight can be used to coat certain substrates.

It is further contemplated that when the radiation curable oil or the radiation curable oligomer is prepared, that it is synthesized in a reactive solvent. For example, when acrylic acid is used for the formation of either the oil or the oligomer derivatives, the excess acrylic acid is useful to drive the reaction to completion. The unreacted, excess acrylic acid thenn becomes a portion of the solvent blend. When a mixture of an oil and oligomer is employed, they may be synthesized either simultaneously or in sequence.

FLOW CONTROL ADDITIVES

The flow control additives serve the purpose of promoting wetting of the substrate when the coating is applied. The flow control additives may also introduce some viscosity or body to the radiation curable coating formulation. Since the flow control additive is polymeric in nature, the additive affects the viscosity, although the flow behavior is most likely Newtonian. The additive thus allows the viscosity to build, but most probably does not crosslink and enter into the curing reaction. The flow control additive must be compatible with the system and preferably should have a large amount of hydrocarbon character. The purpose is to reduce cohesive forces of the overall system with a polymeric constituent. The additive's contribution is reflected in improved film properties, more particularly improved adhesion, reduced porosity, and a smoother film appearance. The flow control additive should have a molecular weight of at least 1500 and should comprise some 2 to 40 weight percent of the total coating composition, depending upon the required viscosity, type of flow control additive, and the balance and nature of the other system components. The flow control additives may or may not contain unsaturation. Because of its high molecular weight, the flow control additive is non-fugitive in character.

Flow control additives which are useful in the practice of the present invention include:
  a. Cellulose acetate butyrate polymer, 50% butyrate, zero free hydroxyl
  b. Cellulose acetate butyrate polymer, 55% butyrate
  c. Cellulose acetate butyrate polymer, 27% butyrate
  d. Styrene-Allyl alcohol copolymers
  e. Modaflow (A viscous hydrocarbon resin modifier sold by Monsanto)
  f. Polyvinylbutyrals (Butvar resins from Monsanto)
  g. Polyvinylethers (Gantrez MO93 polyvinyl ether, Gantrez AN8194 copolymer of N-octylvinyl ether and maleic anhydride available from General Aniline and Film Corp.).

The polymeric flow control additive may or may not participate in the radiation crosslinking reaction. If participation does occur, it should be minimal since too much crosslinking affects adhesion as well as flexibility. Adhesion is adversely affected by building too many residual stresses which are not thermally relieved. Similarly too much crosslinking destroys flexibility by embrittling the films.

If the polymeric flow control additives are known to degrade, then degradation is controllable through low cure doses which are absolutely required for the fast line speed necessary for the coil coating process. The flow control additives should be chosen such that it can contribute desirable film properties to the coating. Controllable factors are its molecular weight, the degree of substitution on the backbone of the additive, the number of active sites on the molecule and the type and number of hydrophilic units. Normally a minimum number of hydroxyl groups are required. For the purpose of this invention hydroxyl content of no less than 5 to 20 weight percent is most desirable. It is further desirable that the radiation flow control additive contain an appreciable number of flexibilizing groups attached to the backbone. Examples of flexibilizing groups are butyl groups and these groups should be no less than 20 to 60 weight percent of the backbone constituents when they are employed. Finally the molecular weight of the flow control additives should be such that the amount used will not cause the viscosity of the resinous composition to exceed 100 seconds on the No. 4 Ford Cup, in order to insure good coating application characteristics.

SYSTEM SOLVENTS

The coating compositions of the present invention must contain at least 20% by weight of acrylic acid, which functions as a solvent. The solvent system contemplated in this invention consists of either acrylic acid, or mixtures of acrylic acid and at least one other acrylic monomer. When a mixture is used the solvent system must contain at least 25 weight percent acrylic acid. The range of the other acrylic monomer used may comprise up to 75 percent of the total solvent composition. It is preferred that the solvent system comprise at least 60% by weight acrylic acid and solvent systems of 100% acrylic acid may be advantageously used as is demonstrated by some of the following examples. It is contemplated that the monomeric solvent constituents will have a molecular weight of less than 300.

The useful solvents or solvent mixtures for this invention must not only solvate the system but be capable of wetting any lubricant layer which may exist on the "as received" substrate itself. Once intimate contact is developed, the porosity of the film is reduced, adhesion can be promoted, and overall film properties improved.

Acrylic acid has a surface tension of about 29 dynes/cm and, therefore, is capable of wetting many of the common lubricants used on metal surfaces. Furthermore, acrylic acid can attack the underlying metal substrate to form a chemical link between the coating solvents and the substrate. Since the monomer-solvent is eventually converted into film, adhesion of the film to the substrate can be developed. Basically, the acid concentration is critical. If insufficient amounts of acrylic acid are used, the coating does not form sufficient tie-ins or adhesion between the coating and the substrate to overcome shrinkage forces which are developed when the film is cured. Since carboxyl groups are known to be hydrophilic, and coatings with a high carboxyl content are usually water sensitive, it is surprising that coatings formulated with the levels of acrylic acid required in this invention are capable of pasteurization resistance and will accept thermally cured water-base topcoats without lifting of the basecoat.

The co-monomer used as a mixture with acrylic acid to form the solvent should be compatible with acrylic acid and also have a significantly low surface tension. The surface tension of the co-monomer should be no greater than 45 dynes/cm and preferably less than 30 dynes/cm. A partial list of commercially available monomers which meet this requirement are the following:

| Monomer | Surface Tension |
|---|---|
| 2-ethylhexyl acrylate | 20 dynes/cm |
| butyl acrylate | — |
| isodecyl acrylate | 27.1 |
| butyl cellosolve acrylate | 28.5 |
| cellosolve acrylate | 29.2 |
| diacetone acrylamide | — |
| acrylamide | — |
| isobutyl acrylate | — |
| cyclohexyl acrylate | — |

When substrates which have oil on the substrate surface are to be coated, it is contemplated that coatings based on solvent systems having an overall surface tension no higher than about 30 dynes/cm will give superior adhesion.

It is further contemplated that the co-monomer be monofunctional with respect to unsaturation, since polyfunctional monomers tend to embrittle the coating and cause undue stress buildup within the film. Methacrylic derivatives may be employed, however, they are not preferred since they generally require a higher dose to cure. High dose to cure results in slower line speeds which is an undesirable direction for the high speed coating technique envisioned in this invention.

The total system of this invention thus contains three essential components properly balanced to form a unique radiation curable coating meeting the background requirements. By proper material selection, formulations can be devised, the starting materials of which can be found in Section 121, 2514 of the FDA Register, thus rendering potential FDA approval for the composition.

When formulated properly the coating composition of the present invention can be cured at relatively low doses. Normally, the coating compositions of the present invention cure within the range of 1.5 to 5.0 megarads with dose rates of about 10 to 100 megarads per second. These coatings are designed to be cured in inert atmospheres, having an oxygen content less than 1%. A flame treatment may be used after cure to scavenge unconverted residuals. This approach may be highly desirable when these coating compositions are used for internal components of food containers.

The following examples will serve to illustrate the compositions of the present invention, but it is understood that these examples are set forth merely for illustrative purposes and many other compositions are within the scope of the present invention.

EXAMPLE 1

Into a 1000 ml flask equipped with a stirrer, air condenser and thermometer were mixed the following:

| 130 grams of | silicone intermediate |
|---|---|
| 80 grams | cellulose acetate butyrate polymer (55% butyrate) |
| 280 grams | acrylic acid |
| 280 grams | 2-ethylhexyl acrylate. |

The silicone intermediate was a commercially available material sold under the designation Z-6018. It is a hydroxyfunctional intermediate having an average molecular weight of about 1600 and a theoretical formula of

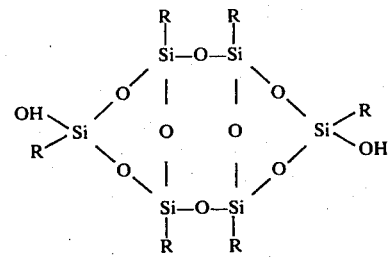

wherein R indicates an organic group (principally phenyl).

The mixture was then heated to 100° centigrade for a period of 2 hours to form the complete coating composition including the curable resin, the flow control additive and the solvent.

Films of the above mixture containing a radiation curable oil, flow control additive, and preferred solvent blend were then drawn down on an "as received" tin-free steel substrate using a 0.5 mil drawdown bar and cured at 5 MRads under nitrogen. Formulations similar to this example were prepared except that one of each of the major film constituents was eliminated. The data appeared in Table I.

Table I

| Composition | Surface Cure | Performance Adhesion | Flexibility | Flow |
|---|---|---|---|---|
| Example 1 Resin, flow control additive, and solvent | Tack free | 10 | Pass | Excellent |
| Example 1 Resin and flow control additive. Solvent made up of 100% 2-ethylhexyl acrylate | Oily | 0 | Pass | Fair |
| Example 1 Resin and solvent. Flow control additive omitted | Slightly tacky | 10 | Pass | Poor (porous) |
| Solvent and flow control additive only | Very slightly tacky | 10 | Poor | Excellent |

The omission of one of each major constituent produces unacceptable film properties as demonstrated in Table I above.

EXAMPLE 2

An acrylic acid epoxy adduct was formed by mixing the following materials in a 1000 ml three neck flask equipped with a stirrer, thermometer and condenser:

| | | |
|---|---|---|
| 360 | grams | acrylic acid |
| 442.5 | grams | epoxidized linseed oil (Epoxol 9–5) |
| 0.5 | grams | mono-methylether of Hydroquinone |
| 4.0 | grams | triethylamine |

The mixture was heated to 100°C. for a period of 12 hours. The epoxy number of the resulting acrylic acid epoxy adduct was then determined and found to be 0.15.

The above product was then mixed accordingly:

| | | |
|---|---|---|
| 130 | grams | acrylic acid epoxy adduct, above |
| 255 | grams | acrylic acid |
| 348 | grams | 2-ethylhexyl acrylate |
| 87 | grams | cellulose acetate butyrate polymer (55% butyrate). |

A coating was applied by means of a roll coater to "as received" aluminum substrate at a film weight of 3.4 milligrams per inch square. The coated panels were then cured at 5 megarads under nitrogen. Evaluation of the film is shown in Table II.

Table II

Performance Evaluation of Example 2
Radiation Curable Can Coating Formulation

Substrate: H-19 Aluminum "As Received"
Dose: 5 Megarads, Inert Atmosphere
Application: Roll Coater at 3.4 mg./in.$^2$

| PROPERTY | RESULT |
|---|---|
| Initial viscosity | 26 seconds |
| Final viscosity | 32 seconds[1] |
| Adhesion, cross hatch | 100% pass |
| Adhesion, burr edge | 100% pass |
| Acetone rubs after cure | 10 |
| Adhesion after pasturization in beer | 100% pass |
| Porosity, milliamps | 5.7 ± 4.3 |
| Wedge bend | 100% pass |
| End fabrication | 100% pass |
| Copper sulfate pinholing test | 95% pass |
| Flavor and odor evaluations | 100% pass[2] |
| FDA listing of components, Section 121,2514 | Okay |

[1]After 45 minutes in roll coater at 77°F.
[2]Cannot be distinguished from control.

EXAMPLE 3

The following were mixed in a 1000 ml three neck flask equipped with a stirrer condenser and thermometer:

| | | |
|---|---|---|
| 130 | grams | acrylic acid epoxy adduct of Example 2 |
| 255 | grams | acrylic acid |
| 348 | grams | 2-ethylhexyl acrylate |
| 80 | grams | Hydrocarbon resin modifier (Modaflow) |

Films were drawn down on aluminum substrate at the 0.5 mil thickness with a drawdown rod and cured at the 5 megarad dose level under nitrogen. The data appears in Table III.

Table III

| Performance Parameter | Result |
|---|---|
| Initial viscosity, sec. No. 4 Ford Cup | 35 |
| Adhesion, cross hatch | 100% pass |
| Adhesion, burr edge | 100% pass |
| Surface cure at 5 MRads (N$_2$) | Tack free |
| Wedge Bend | 100% pass |
| Leveling & flow, appearance | Good |

EXAMPLE 4

Into a 1000 ml three neck flask equipped with a stirrer, thermometer, Dean and Stark trap and condenser were added the following:

| | | |
|---|---|---|
| 467 | grams | hydrogenated castor oil (Castorwax) |
| 216 | grams | acrylic acid |
| 0.5 | grams | mono-methyl ether of hydroquinone |
| 18 | grams | concentrated sulfuric acid |
| 50 | grams | benzene |

The mixture was heated to the reflux for a period of 10 hours. After the removal of 20 ml of water, the mixture was sparged with air to remove the benzene solvent.

The above product was then mixed accordingly:

| | | |
|---|---|---|
| 130 | grams | hydrogenated castor oil - acrylic acid adduct |
| 500 | grams | acrylic acid |
| 35 | grams | resin modifier (Gantez AN8194) |

The composition was tested as a 1.0 mil drawdown on "as received" aluminum substrate and found to cure tack free at the 5 megarad dose level under nitrogen. Cross hatch adhesion to the aluminum substrate immediately upon emerging from the beam was 100% pass. The coating was able to withstand 20 in. lbs. of indirect impact and pass a waater pasteurization test of 100°C. for 10 minutes with no blushing or adhesion failure of the coating.

EXAMPLE 5

Into a 1000 ml three neck flask equipped with a stirrer, thermometer and air condenser were added:

| | | |
|---|---|---|
| 570 | grams | Epon 828 |
| 408 | grams | acrylic acid |
| 0.4 | grams | mono-methyl ether of hydroquinone |
| 4 | grams | dimethylbenzyl amine |

Epon 828 is a bisphenol-A epichlorohydrin condensation product having an average molecular weight of about 380 and an equivalent weight of about 185.

The reaction mixture was heated to 95°C. for a period of 7 hours. The final epoxy number was determined and found to be 0.15 and the final acid value was found to be 130.

The above product was then mixed accordingly.

| | | |
|---|---|---|
| 315 | grams | acrylic acid epoxy adduct, above |
| 300 | grams | acrylic acid |
| 90 | grams | acrylic acid epoxy adduct of Example 2 |
| 45 | grams | cellulose acetate butyrate, 38% butyrate |
| 150 | grams | butyl cellosolve acrylate |

The above formulation was roll coated on "as received" aluminum substrate at a film thickness of 3.0 mg./in.$^2$. The coating was cured under nitrogen at varying dose levels and elevated for surface and through cure. The data appears in Table IV. Adhesion to the "as received" substrate was 80% pass at 1.5 megarads, and 100 percent pass at 2.5 and 5.0 megarads.

TABLE IV

Cure response of Example 5 Composition

| Dose, MRads | Surface Cure | Through Cure (Acetone Rubs) |
|---|---|---|
| 1.5 | Tack Free | 10 |
| 2.5 | Tack Free | 30 |
| 5.0 | Tack Free | 49 |

EXAMPLE 6

The composition of Example 5 was applied to "as received" tin-free steel substrate at a film thickness of 3.0 mg./in.$^2$ by means of the roll coater. The coating was cured at the 5 megarad dose under nitrogen. Subsequently a 3.0 mg./in.² coating of a polyvinyl chloride topcoat in a three component solvent mixture consisting of methyl isobutyl ketone, xylene, and dimethylformamide solvents was applied by means of a second roll coater. The combination was then baked in an oven for 8 minutes at 350°F. There was no blistering of the radiation cured base coat and the combination was tested for properties development. The data is shown in Table V.

TABLE V

| Film Properties of Example 6 Composition | |
|---|---|
| Property | Result |
| Adhesion, cross hatch | 100% pass |
| Adhesion, burr edge | 100% pass |
| Impact resistance, indirect | > 30 |
| Porosity | 0.23 milliamps (avg. of six readings) |
| Appearance, flow, leveling | Excellent |
| Water resistance after 10 minutes at 100°C. | No blush or adhesion failure |

EXAMPLE 7

The composition of Example 5 was applied to "as received" tin-free steel substrate at a film thickness of 3.0 mg./in.² by means of a roll coater and cured aat the 5 megarad dose level under nitrogen. Subsequently an acrylic emulsion (E 897 from Rohm & Haas) was applied as a topcoat by means of a second roll coater and the combination baked in an oven for 10 minutes at 350°F. There was no blistering of the radiation cured base coat and the properties of the film combination was similar to those detailed in Example 6.

EXAMPLE 8

Formulation of Example 5 was repeated except that the butyl cellosolve acrylate/acrylic acid ratio was varied over the range shown in the Table VI. Film properties are also detailed in the same table.

TABLE VI

| Solvent Variations of Example 8 Composition | | |
|---|---|---|
| Weight Ratio Acrylic Acid Butyl Cellosolve Acrylate | Surface Cure | Adhesion to "as received" Aluminum |
| 4/1 | Tack Free | 100% Pass |
| 2/1 (Example 5) | Tack Free | 100% Pass |
| 1/4 | Tack Free | 100% Pass |
| 100% butyl cellosolve acrylate | Tack Free | Fail |

EXAMPLE 9

Into a 1000 ml three neck flask equipped with a stirrer, air condenser and thermometer were added:

| 570 grams | Epoxy resin* [bisphenol A-epichlorohydrin condensation product having an equivalent weight of 175 and an approximate molecular weight of 350.] |
|---|---|
| 408 grams | Acrylic acid |
| 0.5 grams | Methyl ether of hydroquinone |
| 5.0 grams | 2-Picoline |

*Sold under the tradename DER 332

The reaction mixture was heated to 100°C. for 10 hours. A final epoxy number was determined and found to be 0.20 and the final acid value was determined and found to be 140.

The above product was then mixed accordingly:

| 315 grams | acrylic acid epoxy adduct above |
|---|---|
| 300 grams | acrylic acid |
| 90 grams | Hydrogenated castor oil derivative of Example 4 |
| 35 grams | resin modifier (Gantrez MO 93) |
| 150 grams | isodecyl acrylate |

The mixture was drawn down on "as received" aluminum substrate at 0.5 mil film thickness and cured at 5 megarads under nitrogen. The coating cured tack free and passed initial adhesion 100%. A similar drawdown was mde on "as received" TFS substrate. The composition again cured tack free at the 5 megarad dose level and passed cross hatch adhesion 100% after thermal treatment for 2 minutes at 400°F.

EXAMPLE 10

Into a 1500 ml three neck flask equipped with stirrer, thermometer and air condenser were added:

| 390 grams | *epoxy resin — [phenyl novolac resin — epichlorohydrin condensation product having an equivalent weight of 179.] |
|---|---|
| 120 grams | lauric acid |
| 2.5 grams | dimethylbenzyl amine |

*Sold under the tradename DEN 438

The mixture was heated to 150°C. for 2 hours. The acid value was determined and found to be 2.4. Then the following were added to the flask:

| 383 grams | acrylic acid |
|---|---|
| 130 grams | resin modifier Cellulose acetate butyrate polymer, 50% butyrate, zero free hydroxyl |
| 0.5 grams | mono-methyl ether of hydroquinone |
| 2.5 grams | dimethylbenzyl amine |

Heating was continued at 100°C. for 8 hours. At the end of this heating period 50 grams of cellulose acetate butyrate polymer (50% butyrate) was added and the mixture cooled to room temperature. The mixture was then further diluted with 1000 grams of acrylic acid. The final viscosity was found to be 250 cps.

The above formulation was applied by a roll coater at 3.5 mg./in.² on "as received" tin-free steel and aluminum substrate. The coating was cured at 5 megarads under nitrogen. Excellent flow was achieved and the coating properties are summarized in Table VII.

TABLE VII

| | Performance of Example 10 Composition | |
|---|---|---|
| | Results on: | |
| Test Parameter | Tin-free steel | Aluminum |
| Surface cure | Tack free | Tack free |
| Adhesion, cross hatch | 100% pass[1] | 100% pass |
| Flexibility, wedge bend | 100% pass | 100% pass |
| Pasteurization resistance 10 minutes at 100°C. plus 24 hours water soak | No blush; pass adhesion 100% | No blush; pass adhesion 100% |

TABLE VII -Continued

Performance of Example 10 Composition

| Test Parameter | Results on: Tin-free steel | Aluminum |
|---|---|---|
| Topcoat Acceptance | | |
| a. Water based | Pass-no blistering or adhesion failure | — |
| b. Solvent based | Pass-no blistering or adhesion failure | — |

[1] After 8 minutes at 350°F. prior to test.

The present invention allows the formulator to prepare coating compositions wich are radiation curable and which meet the coating requirements of the metal decorator as well. In addition, the coating composition described herein can be tailored so that the metal decorator can use high speed coil coating lines for application. Further the formulation of these coating compositions can be adjusted so that good adhesion can be developed on "as received" metal substrates. It has also been found that coating compositions of the present invention can be applied as prime coats, base coats or as single coat systems. The radiation cured compositions of the present invention can be topcoated with either a solvent topcoat composed of strong solvents such as toluene, ketone, dimethylforamide and mixtures thereof, or the more ecology acceptable water base topcoat and still meet the need for performance requirements dictated by the metal decorators.

Auxiliary materials such as leveling agents, antioxidants, pigments or dyes may be used with the compositions of this invention. The forms of invention herein shown and described are to be considered only as illustrative. It will be apparent to those skilled in the art that numerous modifications may be made therein without departure from the spirit of the invention or the scope of the appended claims.

We claim:

1. A radiation curable coating composition for metal containers which comprises from about 10–78% by weight of a radiation curable oil wich is the reaction product of up to about one mole of a long chain fatty acid, and at least 1.5 moles of acrylic acid, with one mole of a low molecular weight polyfunctional material selected from the group consisting of polyols and polyepoxy resins, said polyfunctional material having a functionality of at least about 2.5, said radiation curable oil having from about two to about six radiation sensitive acrylate groups per 1000 molecular weight, and an average molecular weight between 300 and 2000; from about 2–40% by weight of a flow control additive; and from about 20–80% by weight of a solvent, said solvent being selected from the group consisting of acrylic acid and mixtures of acrylic acid with another acrylic monomer having surface tension no higher than about 45 dynes per cm, said acrylic acid comprising at least 20% by weight of said coating composition, said coating composition being substantially free of non-converting solvents.

2. A radiation curable coating composition for metal containers which comprises from about 10–78% by weight of a mixture of a radiation curable oil and a radiation curable oligomer, said radiation curable oil being the reaction product of acrylic acid or methacrylic acid and a vegetable oil derivative and having from about 2 to about 6 radiation sensitive sites per 1,000 molecular weight and an average molecular weight between about 300 and 2,000; said radiation curable oligomer having an acrylate functionality of at least 2 and an acrylate equivalent weight of no more than about 300; said mixture containing from about 0.5 to about 3 parts by weight of a radiation curable oligomer for each part by weight of radiation curable oil; from about 2–40% by weight of a flow control additive; and from abut 20–80% by weight of a solvent, said solvent being selected from the group consisting of acrylic acid and mixtures of acrylic acid with another acrylic monomer having a surface tension no higher than about 45 dynes per cm, said acrylic acid comprising at least 20% by weight of said coating composition, said coating composition being substantially free of non-converting solvents.

3. A coating composition as described in claim 1, wherein said polyfunctional material is a polyepoxy resin.

4. A coating composition as described in claim 1, wherein said flow control additive has a molecular weight of at least 1500.

5. A coating composition as described in claim 4, wherein said flow control additive contains from about 5 to about 20% by weight of hydroxyl groups.

6. A coating composition as described in claim 4, wherein said additive is a cellulose acetate butyrate polymer containing from about 20 to about 60% by weight of butyrate.

7. A coating composition as described in claim 1 wherein solvent comprises at least 60% by weight of acrylic acid.

8. A coating composition as described in claim 1, wherein said solvent consists essentially of acrylic acid.

9. A coating composition as described in claim 7, in which the solvent has an overall surface tension no higher than about 30 dynes/cm.

10. A coating composition as described in claim 2 wherein said radiation curable oil comprises the reaction product of acrylic acid and an epoxidized vegetable oil.

11. A coating composition as described in claim 2 wherein said radiation curable oil comprises the reaction product of acrylic acid and a hydroxy-functional vegetable oil.

* * * * *